United States Patent [19]
Young

[11] Patent Number: 5,881,489
[45] Date of Patent: Mar. 16, 1999

[54] INTEGRATED HANDLE FISHING REEL HOUSING

[75] Inventor: John Newton Young, Fairfax, Calif.

[73] Assignee: Charles C. Worth Corporation, San Rafael, Calif.

[21] Appl. No.: 696,496

[22] Filed: Aug. 14, 1996

[51] Int. Cl.⁶ .................................................. A01K 87/06
[52] U.S. Cl. ............................................................ 43/20
[58] Field of Search ................................. 43/20, 21.2, 22, 43/23, 24–41; 242/137.1, 138

[56] References Cited

U.S. PATENT DOCUMENTS

| | | | |
|---|---|---|---|
| 686,647 | 11/1901 | Booth | 43/20 |
| 2,465,744 | 3/1949 | Olender | 43/18 |
| 2,746,695 | 5/1956 | Clay | 242/84.5 |
| 2,783,952 | 3/1957 | Clay | 242/84.4 |
| 2,957,264 | 10/1960 | Ruff | 43/20 |
| 3,015,183 | 1/1962 | Nowakowski | 43/20 |
| 3,618,253 | 11/1971 | Edwards . | |
| 4,027,419 | 6/1977 | Popeil | 43/20 |
| 5,581,932 | 12/1996 | Bell | 43/26.1 |
| 5,740,976 | 4/1998 | Zwayer | 242/310 |

FOREIGN PATENT DOCUMENTS

| | | | |
|---|---|---|---|
| 536624 | 1/1957 | Canada | 43/20 |
| 2517174 | 6/1983 | France | 43/20 |

*Primary Examiner*—Jack W. Lavinder
*Attorney, Agent, or Firm*—Virginia H. Meyer, Esq.

[57] ABSTRACT

An integrated handle fishing reel housing for enclosing a fishing reel and providing a handle for manual grasping of the reel and an associated rod. The inventive device includes a handle housing having a forward or nosecone portion and a body or handle portion. The forward portion and the body portions are axially aligned along a common axis, and have a generally circular diameter in cross section, along the common axis. A reel is mounted within the handle housing and directs a fishing line through a forward center end of the forward portion. The body portion of the handle housing projects rearwardly of the forward portion. If desired, the body portion may be shaped so as to define a reduced gripping recess extending circumferentially thereabout to preclude unintentional slipping of the handle housing from a grasp of a user. The disclosed integrated handle fishing reel housings may be made in a variety of shapes, including the shapes of bottles, cans, some buildings, foods, plants, animal and human figures, and cartoon characters.

17 Claims, 8 Drawing Sheets

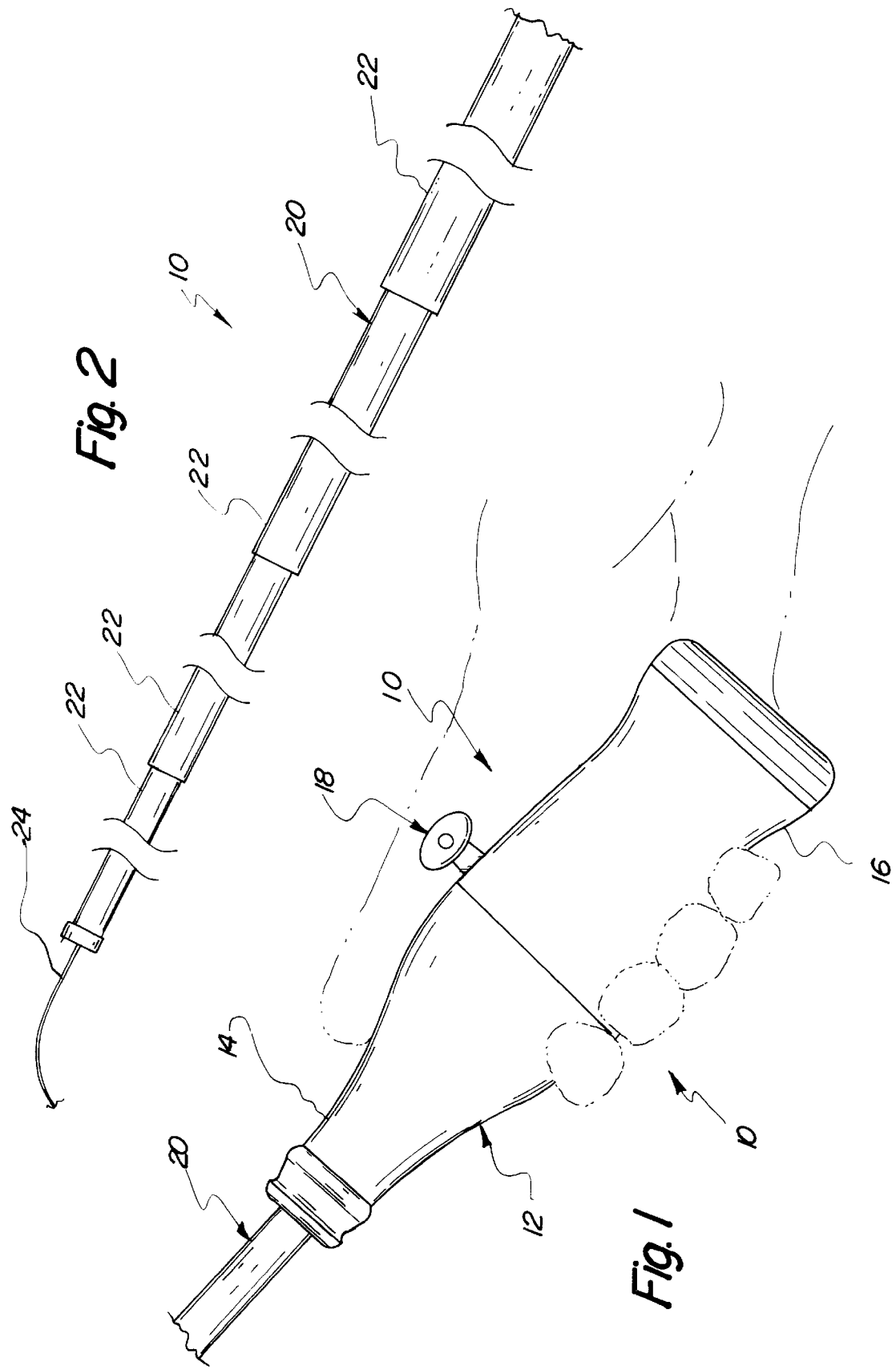

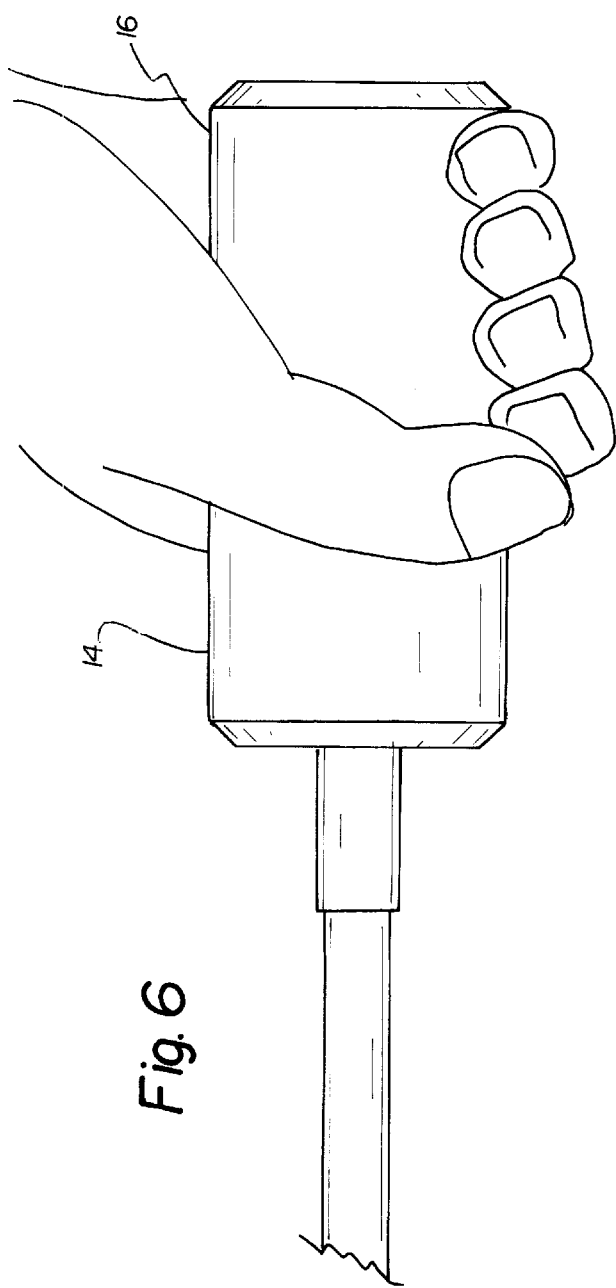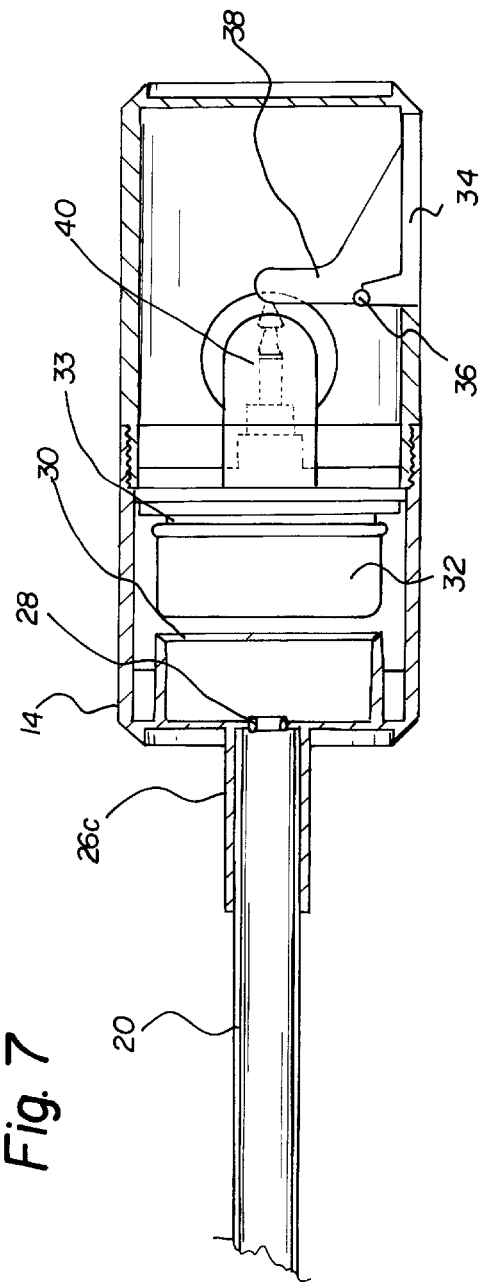

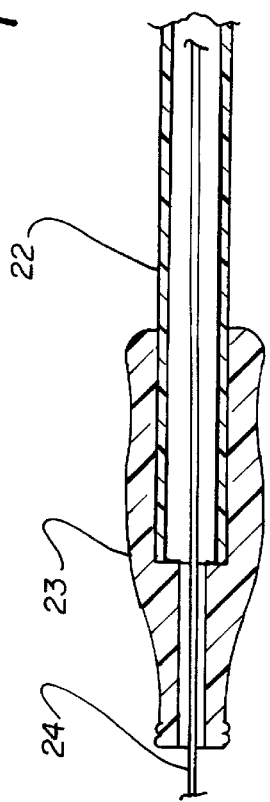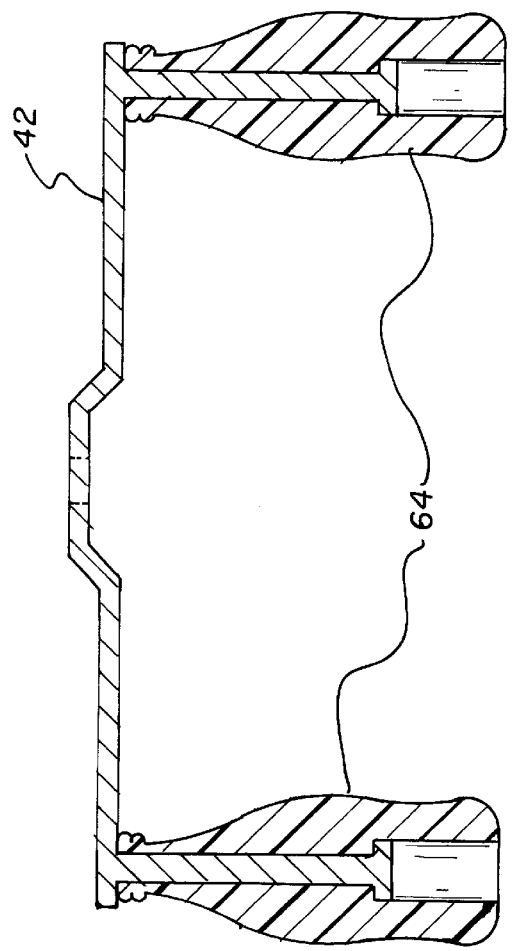

INTEGRATED HANDLE FISHING REEL HOUSING

BACKGROUND OF THE INVENTION

1. Field of the Invention

The present invention relates to fishing reel devices and more particularly pertains to an integrated handle fishing reel housing for enclosing a fishing reel and providing a handle for manual grasping of the reel and an associated rod.

2. Description of the Prior Art

Fishing reels are well known in the art, and over countless ages a wide variety of fishing reel designs and configurations have been devised and developed for the fulfillment of countless objectives and requirements.

While the prior art fishing reel devices fulfill their particular objectives and requirements, the known fishing reel prior art does not disclose an integrated handle fishing reel housing for enclosing a fishing reel and providing a handle for manual grasping of the reel and an associated rod.

SUMMARY OF THE INVENTION

The present invention provides a new and novel integrated handle fishing reel housing design wherein the same construction is utilized for enclosing a fishing reel and providing a handle for manual grasping of the reel and an associated rod. The present invention generally comprises an integrated handle fishing reel housing for enclosing a fishing reel and providing a handle for manual grasping of the reel and an associated rod. The integrated handle fishing reel housing of the invention acts as the handle. There is no part of the handle that does not serve as an enclosure to cover and protect the reel, nor is there any member protruding from the handle reel housing that serves only as a handle for the fishing rod but not a housing for the reel. Therefore, the handle is the reel housing and the reel housing is the handle. A preferred integrated handle fishing reel housing includes a handle housing having a forward portion, which is sometimes referred to herein as the nosecone portion, and a body portion, which is sometimes referred to herein as the handle or gripping portion. According to the teaching of the invention, the forward portion and the body portion are axially aligned along a common axis, and in preferred form, are both substantially circular in diameter in cross section, along a common axis. As used herein, substantially circular includes polygons that are generally circular in diameter, in cross section, plus foods, plants, animal, fish and human figures, some buildings, and/or cartoon characters that are substantially circular in diameter, in cross section. It is not necessary for the cross sectional diameters of the forward and body portions to be constant along their axial lengths, although they may be. A reel is mounted within or to the handle housing and directs a fishing line through a line guide positioned within the forward portion. The line guide is axially aligned along a common axis of the forward portion. The body portion of the handle housing projects rearwardly of the forward portion. The disclosed integrated handle fishing reel housings may be made in a variety of shapes, including the shape of bottles, cans, foods, plants, animals, fish and human figures, some buildings, and cartoon characters. If desired, the body portion of the housing may be shaped so as to define a reduced gripping recess extending circumferentially thereabout so as to prevent unintentional slipping of the handle housing from a grasp of a user.

The more important features of the invention have thus been outlined, rather broadly, so the following detailed description may be better understood, and so the present contribution to the art may be better appreciated.

In this respect, before explaining embodiments of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is an object of the present invention to provide a new integrated handle fishing reel housing for enclosing a fishing reel and providing a handle for manual grasping of the reel and an associated rod.

It is also an object of the present invention to provide a new integrated handle fishing reel housing which may be easily and efficiently manufactured and marketed.

It is a further object of the present invention to provide a new integrated handle fishing reel housing which is of a durable and reliable construction.

An even further object of the present invention is to provide a new integrated handle fishing reel housing which is susceptible of a low cost of manufacture with regard to both materials and labor, and which accordingly is then susceptible of low prices of sale to the consuming public, thereby making such integrated handle fishing reel housings economically available to the buying public.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an elevational view of a first integrated handle fishing reel housing according to the present invention, where the housing is in the shape of a beverage bottle.

FIG. 2 is an elevational view of a rod of the invention.

FIG. 6 is an elevational view of a second integrated handle fishing reel housing according to the present invention, where the housing is in the shape of a beverage can.

FIG. 7 is a cross sectional view of a second integrated handle fishing reel housing of the invention.

FIG. 13 is a cross sectional view of a rod tip of the invention.

FIG. 14 is a cross sectional view of reel handle where the grips are designed to match the exterior shape of the integrated handle fishing reel housing.

DESCRIPTION OF THE PREFERRED EMBODIMENT

Figure 3:
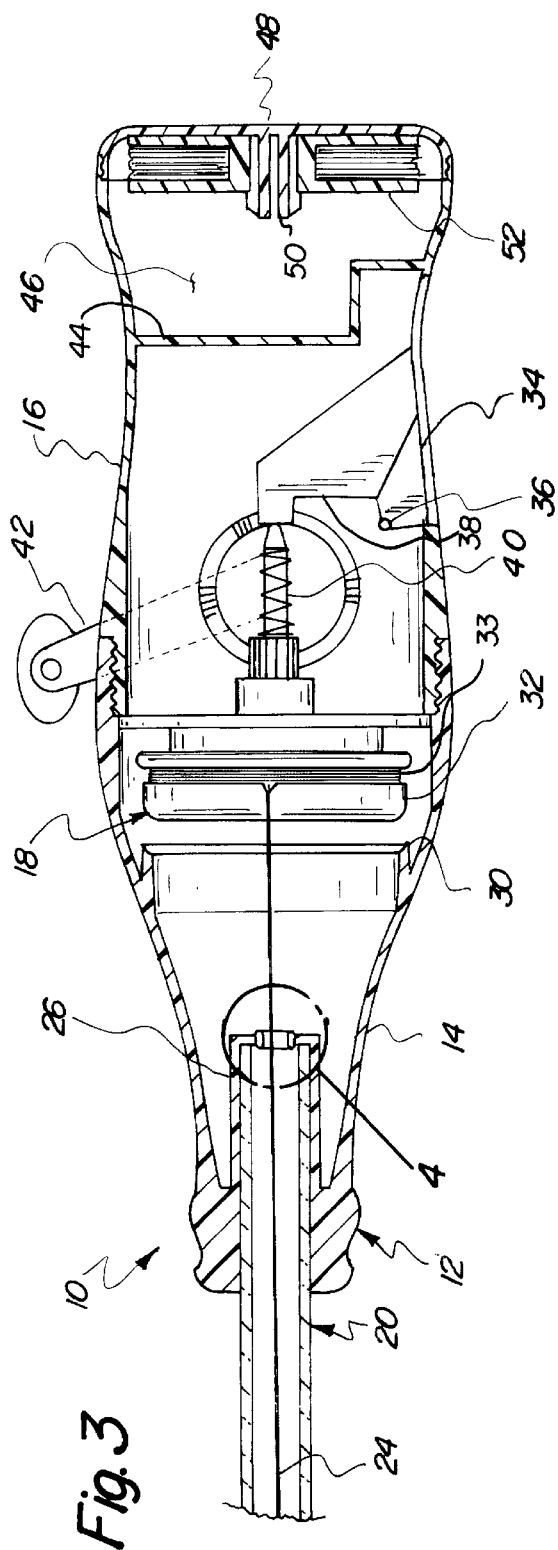
FIG. 3 is a cross sectional view of a first integrated handle fishing reel housing of the invention, where the housing is in the shape of a beverage bottle.

With reference now to FIGS. 1–14 of the drawings, a new integrated handle fishing reel housing embodying the principles and concepts of the present invention and generally designated by the reference numeral 10 will be described.

More specifically, the integrated handle fishing reel housing 10 comprises a reel handle housing 12 having a forward or nosecone portion 14 removably coupled to a body portion 16 substantially as shown in FIGS. 1, 3, 5, 6, 8, 9 and 10 of the drawings. A line winding mechanism 18 is mounted within the reel handle housing 12. A rod 20 can be mounted relative to the reel handle housing 12, and may comprise a telescoping rod including a plurality of telescoping sections 22 which are telescopingly received within each other to permit collapsing of the rod if so desired. The line winding mechanism can be manually operated to effect winding or dispensing of a fishing line 24 directed through the telescoping rod 20, as shown in FIGS. 2 and 3 for example. The line winding mechanism 18 is mounted substantially centrally within the reel handle housing such that the body portion 16 of the housing projects rearwardly from the forward or nosecone portion 14 in an axially aligned orientation.

FIG. 1 shows a fisherman gripping integrated handle fishing reel housing 10 having forward or nosecone portion 14 and body portion 16. Because integrated handle fishing reel housing 10 utilizes the same construction to enclose a fishing reel and provide a handle for manual grasping of the reel, the integrated handle fishing reel housing 10 of the invention the acts as a handle. There is no part of the handle that does not serve as an enclosure to cover and protect the reel, nor is there any member protruding from the handle reel housing that serves only as a handle for the fishing rod but not a housing for the reel. Therefore, the handle is the reel housing and the reel housing is the handle.

Figure 4:
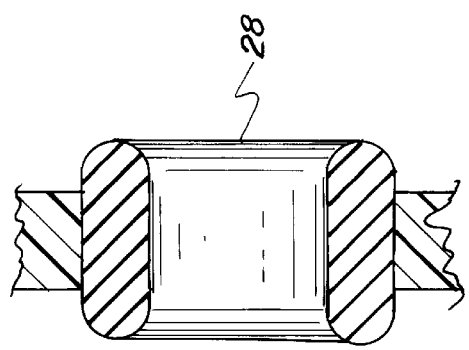
FIG. 4 is a cross sectional view of circled area "4" set forth in FIG. 3 of the drawings.
Figure 5:
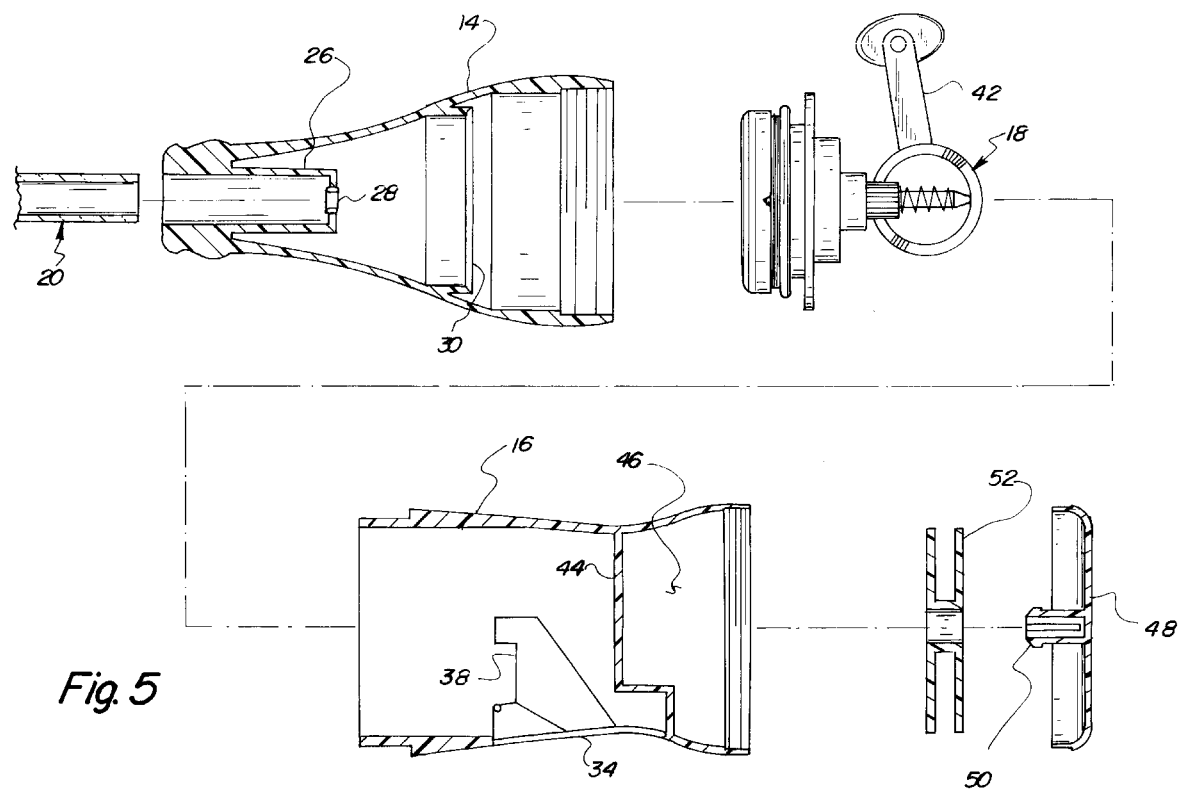
FIG. 5 is an exploded cross sectional view of a first integrated handle fishing reel housing of the invention.

Turning now to FIGS. 3 through 5 wherein a first integrated handle fishing reel housing of the present invention 10 is illustrated in detail, it can be seen that the body portion 16 of handle housing 12 may be shaped so as to define an unlabeled reduced gripping recess extending circumferentially thereabout in order to prevent unintentional slipping of the handle housing from a grasp of a user. If this is desired, the body portion 16 is of a first diameter proximal to a juncture of the body portion 16 and the forward or nosecone portion 14, with the body portion tapering to a second diameter proximal to a center of the body portion between the juncture and an outer end of the body portion. The body portion then continues from the center towards the outer end thereof expanding back to a third diameter. In one form, the first diameter of the body portion is greater than the second diameter thereof so as to define the reduced gripping recess extending circumferentially thereabout. The third diameter defines an enlarged area to provide a stop to help prevent unintentional slippage from the handle housing. By this structure, a human hand holding the housing 12 can securely grip the housing during a fishing procedure.

With continuing reference to FIG. 3, it can be seen that the forward or nosecone portion 14 of the housing 12 preferably includes a mounting receiver 26 extending into a center of a forward end of the forward or nosecone portion 14 within which the rod 20 is adhesively or otherwise fixedly secured. The mounting receiver includes an unlabeled aperture directed therethrough permitting the direction of the fishing line 24 from the handle housing 12 into the center of the rod 20. A grommet 28, as shown in FIG. 4, extends about an interior of the aperture in the mounting receiver so as to prevent abrasion between the fishing line and both the rod and aperture.

To secure the fishing line subsequent to a releasing of the line winding mechanism but prior to a casting of the line, a snubbing ring 30 is mounted within the handle housing and is aligned with a rotor 32 of the line winding mechanism 18. The snubbing ring is preferably integrally formed with the forward or nosecone portion 14 of the handle housing 12 during an injection molding procedure or like operation. To permit casting of a fishing line, a finger-activated free spool button 34 is pivotally mounted within an aperture directed through the body portion 16 of the handle housing 12. The finger-activated free spool button 34 is mounted about a hinge axle 36 and includes a cam lever 38 projecting into the body portion 16 of the housing 12 for engagement with a main axle 40 of the line winding mechanism, whereby an initial depression of the finger-activated free spool button will forwardly push the spool axle to permit release of the fishing line from the spool 33, with a continued depression of the finger-activated free spool button operating to effect abutting positioning of the rotor 32 against the snubbing ring 30 described above. A rotation of a crank 42 of the line winding mechanism 18 will effect line winding of the fishing line 24 back onto the spool 33 in a conventional manner.

To provide for storage within the body portion 16 of the handle housing 12, a dividing wall 44 extends across an interior of the body portion to define a storage compartment 46 between the dividing wall and an outer end of the body portion. An end cap 48 is removably attached to the outer end of the body portion 16 and includes a mounting projection 50 extending therefrom upon which a storage spool 52 of additional fishing line or the like can be provided. By this structure, an individual is provided convenient access into the storage space 46 within the interior of the body portion 16 of the handle housing 12.

As shown in FIG. 5, the forward or nosecone portion 14 and the body portion 16 of the handle housing are preferably threadably coupled together. To this end, the forward or nosecone portion 14 and the body portion 16 define cooperating and unlabeled threaded portions which are overlapped and threadably engaged. For the reel housing 10 to have a proper amount of strength during a fishing procedure, it is desirable for the overlapped portions of the nosecone portion 14 and the body portion 16 to be within a predetermined range of axial lengths in relation to a maximum diameter of the forward or nosecone portion. To this end, a quotient of the maximum forward or nosecone diameter divided by the axial length of the overlapped portions of the forward or nosecone portion 14 and the body portion 16 should fall within the range of approximately 4.3 to 8.9, inclusive. By this structure, a juncture of the forward or nosecone portion 14 and the body portion 16 is sufficiently strong so as to withstand forces applied thereto during the reeling in of a fish.

A second integrated handle fishing reel housing of the invention is shown in FIGS. 6 and 7. In this embodiment, the integrated handle/housing is in the shape of a beverage can rather than a beverage bottle. To attain this shape, the body portion 16 and the forward or nosecone portion 14 are of a constant outer diameter. The forward or nosecone portion of the housing 12 preferably includes a mounting receiver 26c extending from the center of a forward end of the forward or nosecone portion 14 within which the rod 20 is adhesively or otherwise fixedly secured. A grommet 28, as shown in FIG. 4, extends about an interior of the aperture in the mounting receiver 26c so as to prevent abrasion between the fishing line and both the rod and the aperture. The description of a snubbing ring 30 is provided with the description of FIG. 3 above and will not be repeated here. The finger-activated free spool button 34 is mounted about a hinge axle 36 and includes a cam lever 38 projecting into the body portion 16 of the housing 12 for engagement with a main axle 40 of the line winding mechanism, whereby an initial depression of the finger-activated free spool button will forwardly push the spool axle to permit release of the fishing line from the spool 33, with a continued depression of the finger-activated free spool button operating to effect abutting positioning of the rotor 32 against the snubbing ring 30 as described above.

FIG. 6 shows a fisherman gripping integrated handle fishing reel housing 10 having forward or nosecone portion 14 and body portion 16. Because integrated handle fishing reel housing 10 utilizes the same construction to enclose a fishing reel and provide a handle for manual grasping of the reel, the integrated handle fishing reel housing 10 of the invention the acts as a handle. There is no part of the handle that does not serve as an enclosure to cover and protect the reel, nor is there any member protruding from the handle reel housing that serves only as a handle for the fishing rod but not a housing for the reel. Therefore, the handle is the reel housing and the reel housing is the handle.

Figure 8:
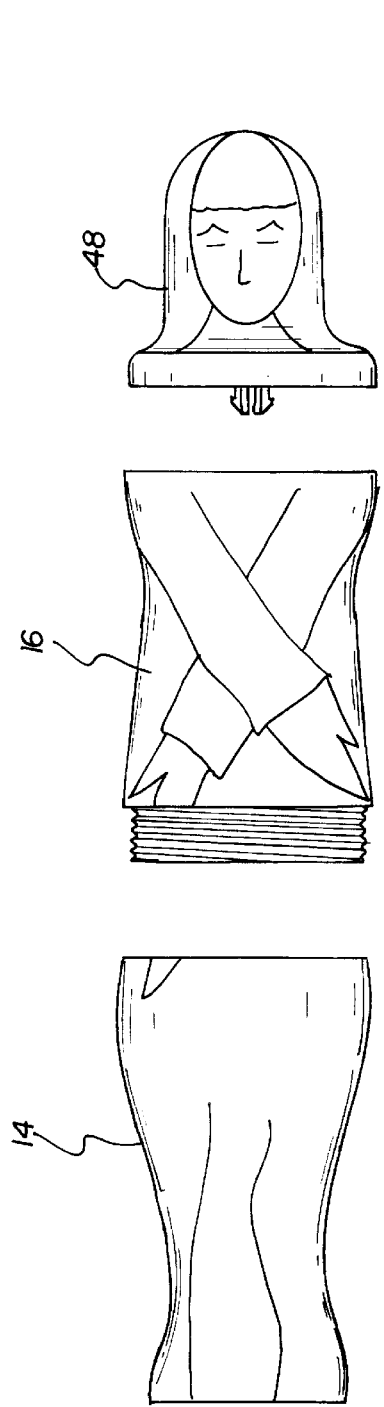
FIG. 8 is a front elevational view of a third integrated handle fishing reel housing of the invention, where the housing is in the shape of a human figure.
Figure 9:
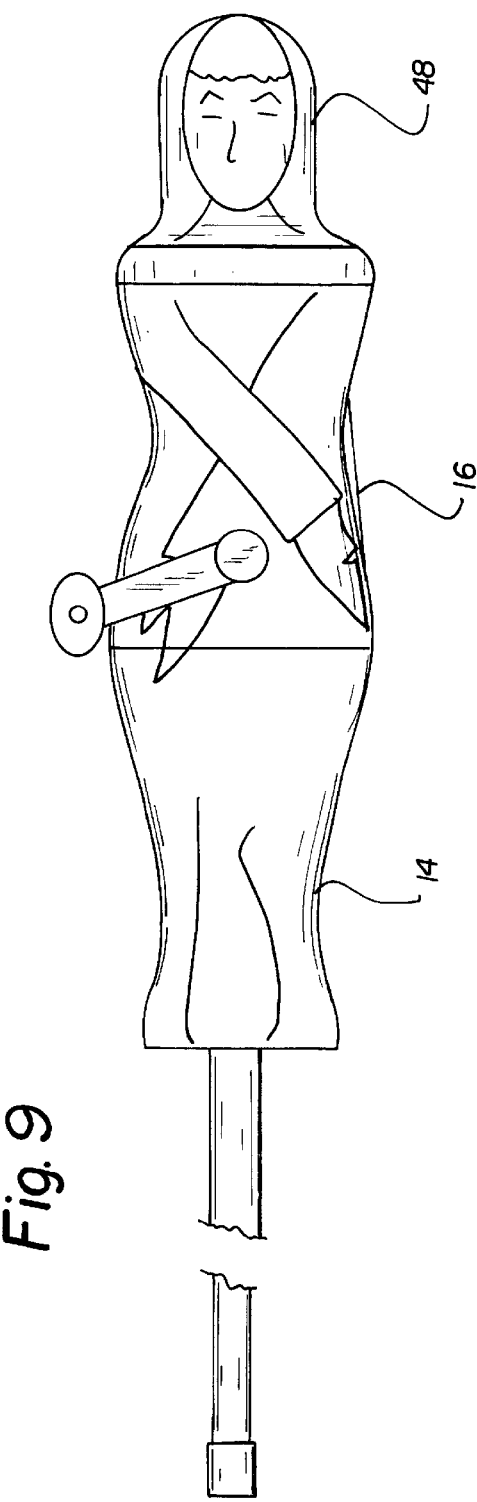
FIG. 9 is a cross sectional view of a third "human figure shaped" integrated handle fishing reel housing of the invention as shown in FIG. 8 of the drawings.

A third integrated handle fishing reel housing is shown in FIGS. 8 and 9. In this embodiment, the integrated handle/housing is in the shape of a human figure. FIGS. 8 and 9 show how a forward or nosecone section 14, body portion 16, and an end cap 48 combine to form a human figure. As shown in FIGS. 8 and 9, end cap 48 is in the shape of a human head and encloses a storage space 46 as described in the disclosure pertaining to FIGS. 3 and 5. The forward or nosecone portion 14 of the housing 12 preferably includes a mounting receiver 26 extending from the center of a forward end of the forward or nosecone portion 14 within which the rod 20 is adhesively or otherwise fixedly secured, again as shown in FIGS. 3 and 5. A grommet 28, as shown in FIG. 4, extends about an interior of the aperture in the mounting receiver 26 so as to prevent abrasion between the fishing line and both the rod and the aperture. The description of a snubbing ring 30 is provided with the description of FIG. 3 above and will not be repeated here. As also shown in FIGS. 3 and 5, the finger-activated free spool button 34 is mounted about a hinge axle 36 and includes a cam lever 38 projecting into the body portion 16 of the housing 12 for engagement with a main axle 40 of the line winding mechanism, whereby an initial depression of the finger-activated free spool button will forwardly push the spool axle to permit release of the fishing line from the spool 33, with a continued depression of the finger-activated free spool button operating to effect abutting positioning of the rotor 32 against the snubbing ring 30 as described above.

Though a human figure is shown in FIGS. 8 and 9, the integrated handle fishing reel housing can be any desired shape as long as the shape allows the reel to be contained within the housing, and allows a human hand to grasp the housing about its boundaries, so it can function as a handle. Anticipated shapes and objects (not shown) include building shapes (e.g., The Empire State Building or the Statue of Liberty), fruit shapes (e.g. a banana), vegetable shapes (e.g., a carrot), fish shapes, cartoon characters, and the like.

Figure 11:
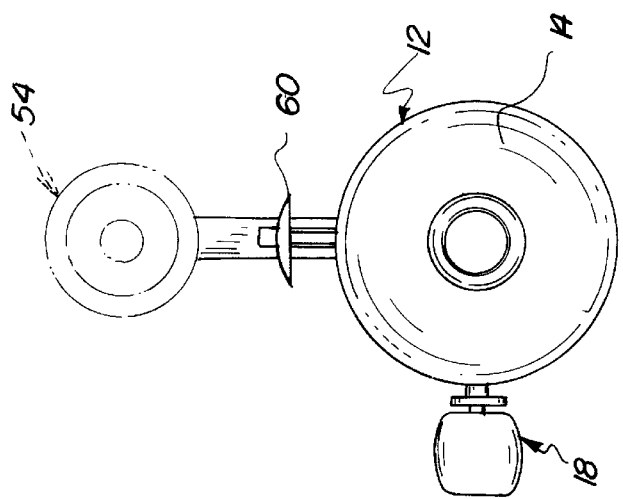
FIG. 11 is front elevational view taken from line 7—7 of FIG. 10.
Figure 10:
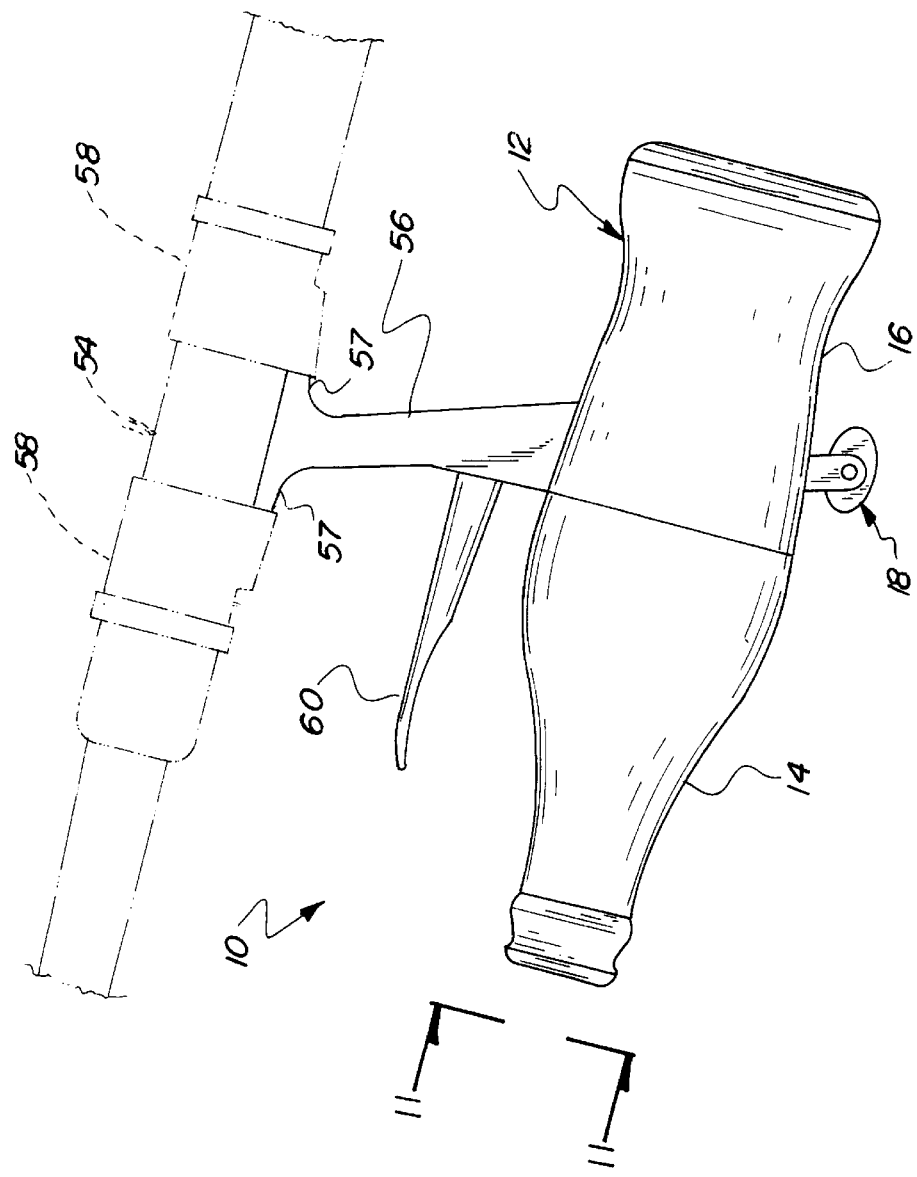
FIG. 10 is an elevational view of a first "bottle shaped" integrated handle fishing reel housing according to the present invention including a handle mount.
Figure 12:
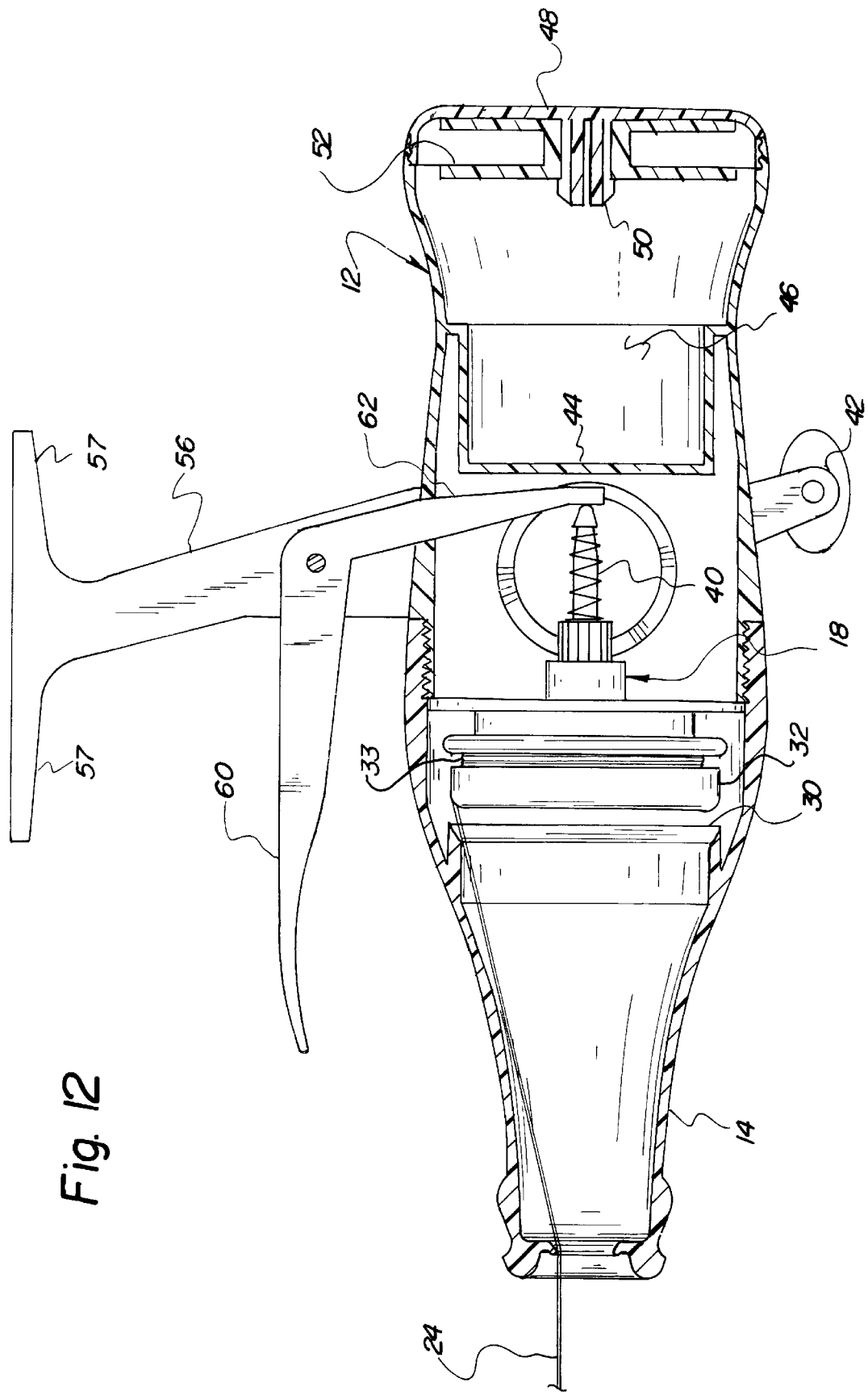
FIG. 12 is a cross sectional view of a first "bottle shaped" integrated handle fishing reel housing of the invention as shown in FIG. 10 of the drawings.

Turning now to FIGS. 10 through 12, it can be seen that the present invention 10 may be constructed, in lieu of the rod 20, with a handle mount 56 extending from the handle housing 12 for coupling with a pre-existing fishing rod 54. To this end, the handle mount 56 is shaped so as to define conventional projecting mounting portions 57 which can be received and secured beneath securing collars 58 of the existing rod 54. In lieu of the finger-activated free spool button 34 of the previous embodiment, a finger-activated release trigger 60 is pivotally mounted to the handle mount 56 and includes a release arm 62 extending into the handle housing 12 and positioned for engagement with the main axle 40 of the line winding mechanism 18, whereby an initial pivoting of the arm bar will forwardly push the spool axle to allow release of line, with a continued pivoting of the release bar operating to effect abutting positioning of the rotor 32 against the snubbing ring 30. As described above, a rotation of the crank 42 of the line winding mechanism 18 will effect winding of the fishing line 24 back onto the spool 33 in the conventional manner. In this embodiment, the forward or nosecone portion 14 is constructed without the mounting receiver, with the fishing line 24 simply exiting the forward end of the forward or nosecone portion 14, as shown in FIG. 12.

In use, an integrated handle fishing reel housing 10 according to the present invention can be easily utilized for reeling fishing line 24 during a fishing procedure.

As indicated above, the integrated handle fishing reel housings of the invention may be made in a variety of shapes, including the shape of bottles, cans, animals, fish, fruits, vegetable, buildings, as well as human figures, and cartoon characters. If desired the specific exterior shape of the body portion 16 of the handle housing 12 may include a reduced gripping recess extending circumferentially thereabout to help prevent unintentional slipping of the handle housing from a grasp of a user.

If still further desired, the exterior shape of the rod tip may mimic the exterior shape of the housing. For example, if the housing is in the shape of a Coke® bottle, the rod tip can have this same bottle shape. The "mimic" can also be carried through to the exterior shape of the reel hand grips, where again, if the housing is in the shape of a Coke® bottle, the reel handle grips can also be of bottle shape. This aspect of the invention is illustrated in FIG. 13, where line 24 passes through bottle shaped rod tip 23 of rod 22, and in FIG. 14 where bottle shaped grips 64 are shown mounted to the crank 42.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A fishing reel housing that also serves as a fishing rod handle, comprising:

a handle reel housing having a forward portion and a body portion;

a winding mechanism mounted within said handle reel housing;

said handle reel housing covering and protecting said winding mechanism and serving as a handle for the fishing rod; and, a dividing wall extending across an interior of said body portion to define a storage compartment between said dividing wall and an outer end of said body portion; and, an end cap wherein said handle reel housing has means for removably attaching said end cap to said outer end of said body portion.

2. The fishing reel housing that also serves as the fishing rod handle of claim 1, and further comprising a storage spool mounting projection extending from an interior surface of said end cap.

3. The fishing reel housing that also serves as the fishing rod handle of claim 1, and further comprising a storage spool mounted to said storage spool mounting projection within said storage compartment.

4. The fishing reel housing that also serves as the fishing rod handle of claim 1, wherein the forward portion and the body portion have substantially circular diameters in cross section extending along a common axis.

5. The fishing reel housing that also serves as the fishing rod handle of claim 1, wherein the handle reel housing is made in the shape of a bottle, a can, a human figure, an animal figure, a fish figure, a plant, a food, a building, or a cartoon character.

6. The fishing reel housing that also serves as the fishing rod handle of claim 1, and further comprising a rod mounted in an axially aligned orientation with said handle reel housing.

7. The fishing reel housing that also serves as the fishing rod handle of claim 6, wherein the rod comprises a telescoping rod including a plurality of telescoping sections that are telescopingly received within each other to permit collapsing of the rod.

8. The fishing reel housing that also serves as the fishing rod handle of claim 7, and further comprising fishing line engaged with the winding mechanism, with the fishing line being directed centrally through the telescoping rod.

9. The fishing reel housing that also serves as the fishing rod handle of claim 6, wherein said forward portion of the housing includes a mounting receiver extending into a center of a forward end of said forward portion within which the rod is fixedly secured.

10. The fishing reel housing that also serves as the fishing rod handle of claim 1, wherein said body portion of said handle reel housing is shaped so as to define a reduced gripping recess extending circumferentially thereabout to prevent unintentional slipping of said handle reel housing from a grasp of a user.

11. The fishing reel housing that also serves as the fishing rod handle of claim 1, and further comprising a snubbing ring mounted within said handle reel housing and aligned with a rotor of the winding mechanism.

12. The fishing reel housing that also serves as the fishing rod handle of claim 11, and further comprising a finger-activated free spool button pivotally mounted within an aperture directed through said body portion of said handle reel housing, said finger button including a finger button lever projecting into said body portion of said handle reel housing for engagement with the main axle of said winding mechanism.

13. The fishing reel housing that also serves as the fishing rod handle of claim 12, wherein said finger-activated free spool button is located substantially opposite to the area of said handle reel housing that would be held in the fisherman's palm.

14. The fishing reel housing that also serves as the fishing rod handle of claim 1, wherein said forward portion and said body portion of said handle reel housing are removably coupled together.

15. The fishing reel housing that also serves as the fishing rod handle of claim 14, wherein said forward portion and said body portion define cooperating and threaded portions that are overlapped and threadably engaged.

16. The fishing reel housing that also serves as the fishing rod handle of claim 15, wherein said overlapped portions of said forward portion and said body portion are within a predetermined range of axial lengths in relation to a maximum diameter of the nosecone portion, with a quotient of the maximum forward diameter divided by the axial length of the overlapped portions of the forward portion and the body portion falling within the range of approximately 4.3 to 8.9, inclusive.

17. The fishing reel housing that also serves as the fishing rod handle of claim 1, wherein a forward most end of said forward portion is shaped so as to define a cap retaining annular projection extending about said forward most end of said forward portion of said handle reel housing.

* * * * *